United States Patent

Nishi et al.

[11] Patent Number: 5,144,414
[45] Date of Patent: Sep. 1, 1992

[54] GHOST CANCELLING DEVICE WITH WAVEFORM CHECKING CIRCUIT

[75] Inventors: Yuji Nishi, Iwai; Shigehiro Ito, Toride; Tatsushi Koguchi, Iwai; Kazuyuki Ebihara, Toride, all of Japan

[73] Assignee: Victor Company of Japan, Ltd., Yokohama, Japan

[21] Appl. No.: 635,001

[22] Filed: Dec. 27, 1990

[30] Foreign Application Priority Data

Dec. 27, 1989 [JP] Japan .................................. 1-341342

[51] Int. Cl.$^5$ .............................................. H04N 5/21
[52] U.S. Cl. ...................................... 358/36; 358/905
[58] Field of Search ................. 358/167, 905, 36, 166, 358/37

[56] References Cited

U.S. PATENT DOCUMENTS 4,393,397 7/1983 Holmes .............................. 358/905
4,912,557 3/1990 Faroudja .......................... 358/167

FOREIGN PATENT DOCUMENTS 0192173 8/1986 Japan .
0117571 5/1988 Japan .
0159885 6/1990 Japan .
0285966 11/1990 Japan .

Primary Examiner—James J. Groody
Assistant Examiner—Jeffrey S. Murrell
Attorney, Agent, or Firm—Lowe, Price, LeBlanc & Becker

[57] ABSTRACT

A ghost cancelling device including a filtering portion made up of a transversal filter for cancelling a ghost component included in input video signals, a waveform extracting circuit for extracting a part, which corresponds to a predetermined period of time and includes a reference signal for cancelling a ghost, of a signal included in the input video signal, a waveform converting circuit for performing the waveform conversion of the signal corresponding to the predetermined of time and extracted from the input video signal, a subtracter for comparing an output of the waveform converting circuit with a preset reference waveform and outputting a signal in accordance with the result of the comparison, a coefficient setting circuit for setting coefficients having values in accordance with the output signal of the subtracter and a waveform checking circuit interposing between the waveform extracting circuit and the waveform converting circuit. The waveform checking circuit decides whether or not the output of the waveform extracting circuit should be sent to the waveform converting circuit. Thus, the ghost cancelling device can interrupt an operation of cancelling a ghost when the input video signal is abnormal and prevent occurrence of a malfunction and a runaway.

5 Claims, 6 Drawing Sheets

GHOST CANCELLING DEVICE WITH WAVEFORM CHECKING CIRCUIT

BACKGROUND OF THE INVENTION

1. Field of the Invention

This invention generally relates to a ghost cancelling device and more particularly to a ghost canceller for use in various kinds of television (TV) equipment and video equipment which perform processing of TV broadcasting waves and video signals obtained by detecting the TV broadcasting waves in order to remove ghost or waveform distortion included in input video signals.

2. Description of the Related Art

In recent years, there has been a trend of development of a display for use in a TV receiver and so on toward a high definition and/or large-screen display. Reflecting this trend, a high definition TV broadcasting system of which typical examples are a "High Vision" and "Clear Vision" Systems has been attracting attention. On the other hand, a ghost (i.e., a multiple image) interference is generated by simultaneously receiving direct waves and indirect waves reflected by, for example, a towering building and a hillside presents a serious problem again. Moreover, a recent increase in towering buildings and so forth has given rise to a rapid expansion of areas in which the ghost interference occurs. Thus, in such areas, there is necessity of reducing and further cancelling ghosts in a TV receiver. Especially, a high-grade TV receiver is demanded to be provided with a ghost canceller for elimination of ghosts from input video signals.

To meet such a demand, a reference signal for cancelling a ghost is inserted in NTSC (National Television System Committee) TV video signals in Japan. More particularly, the reference signal for cancelling a ghost is inserted into a predetermined line of a vertical retrace line interval. A reference pulse is generated from the reference signal for cancelling a ghost and is then used to perform a ghost cancelling operation. The details of such ghost cancelling operation are explained in many documents such a Japanese Magazine "Nikkei Electronics", 1989 8.7 (No. 479), page 121, and Japanese Magazine "Houso Gijyutsu", April. 1989.

Figure 3:
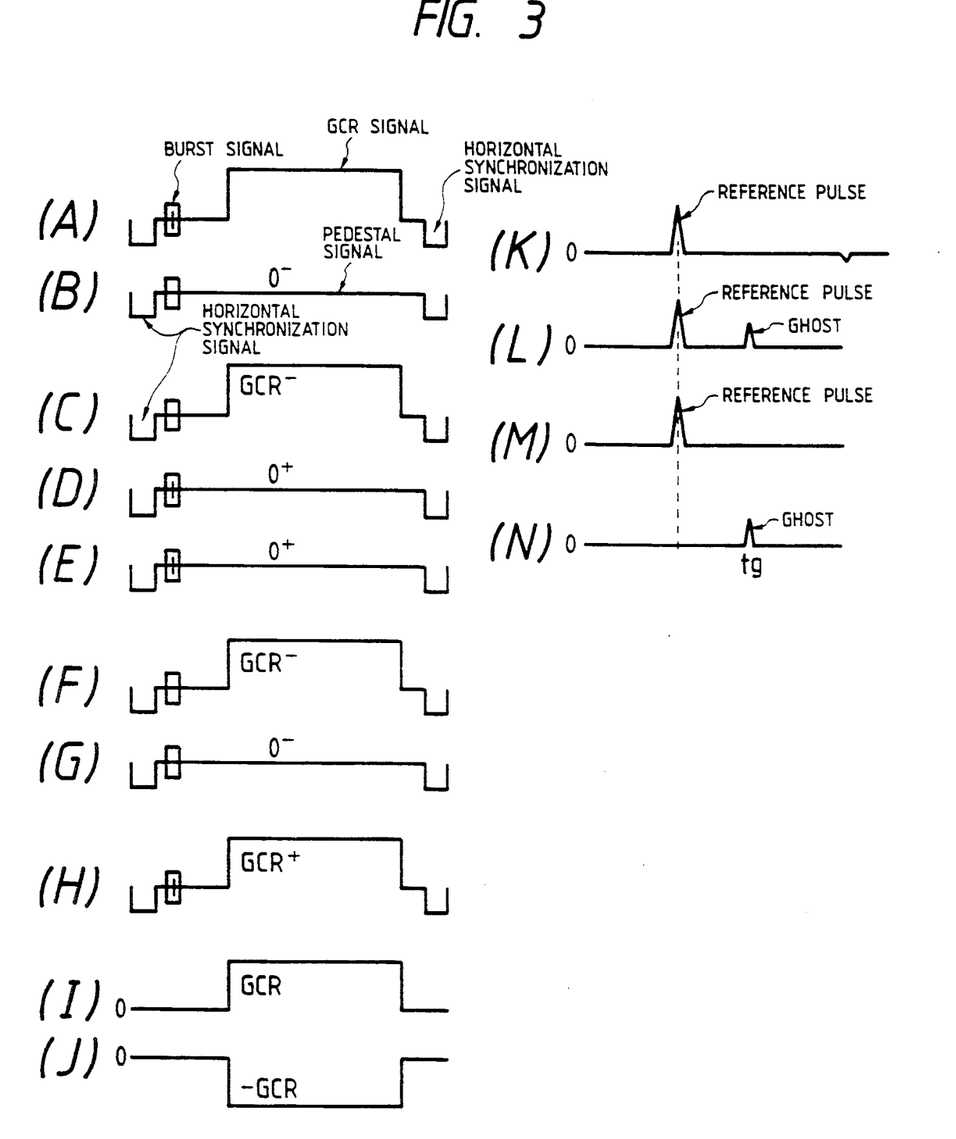

Hereinafter, a method of generating the reference pulse will be described with reference to waveform diagrams of FIG. 3.

As illustrated in FIGS. 3(A)-(J), a reference signal for cancelling a ghost comprises four pairs of a GCR (Ghost Cancel Reference) and pedestal signals, each of which corresponds to a field, inserted in the predetermined line as four phases. Further, a period of repetition of the four phases is eight fields. Incidentally, a GCR signal (see FIGS. 3(A), (C) and so on) is a reference signal (hereunder referred to as a detection reference signal) for detecting a ghost, and a pedestal signal (see FIGS. 3(B), (D) and so on) pairing the GCR signal is an auxiliary signal (hereunder sometimes referred to also as a detection reference signal) for extracting a waveform of a bar-like signal employed as the GCR signal by effecting a subtraction between signals which are distant in time from each other by four fields to cancel a horizontal synchronization signal and a burst signal. The GCR signals are inserted into a first, third, sixth and eighth fields (respectively corresponding to FIGS. 3(A), (C), (F) and (H)). In contrast, the pedestal signals are inserted into a second, fourth, fifth and seventh fields (respectively corresponding to FIGS. 3(B), (D), (E) and (G)).

Incidentally, in this figure, superscripts "+" and "−" written above and to the right side of reference characters "GCR" indicating a GCR signal and of reference numeral "0" indicating a pedestal signal represent polarities of a burst signal corresponding to the predetermined line. As can be understood from FIG. 3, the horizontal synchronization signal and the burst signal are cancelled by a subtraction between signals which are distant in time from each other by four fields, so that positive and negative waveforms of bar-like signals employed as GCR signals respectively illustrated in FIGS. 3(I) and (J) can be extracted. Incidentally, in FIGS. 3(I) and (J), reference characters +GCR and −GCR represent a GCR signal having the positive waveform of a bar-like signal (hereunder referred to as a positive bar-like GCR signal) and another GCR signal having the negative waveform of a bar-like signal (hereunder referred to as a negative bar-like GCR signal), respectively. To obtain a pulse-like reference signal (hereunder sometimes referred to simply as a reference signal), it is necessary to change the GCR signal (i.e., the bar-like signal) into a pulse-like signal as illustrated in FIG. 3(K) by further performing waveform conversion processing such as a difference and differential operations on the waveforms of the positive and negative bar-like GCR signals. Thus, a pulse signal having a waveform extracted from a leading edge portion of the waveform of the bar signal is obtained as a reference pulse. This reference pulse fully contains energy components (i.e., signal components) of which frequencies range from 0 to 4 megahertz (MHz).

Further, FIG. 3(L) shows an example of a waveform in case where a common-mode ghost is generated. A delay time tg and an amplitude and so forth of the ghost are obtained from a sequence of error signals ($\epsilon_n$) of FIG. 3(N) obtained by subtracting a reference waveform of FIG. 3(M) synchronized with the reference pulse from the waveform of FIG. 3(L). Thereby, tap-coefficients (i.e., gains of taps) of a transversal filter are determined and further a weight of the filter is set. This is an operating principle of a ghost cancelling device.

Figure 2:
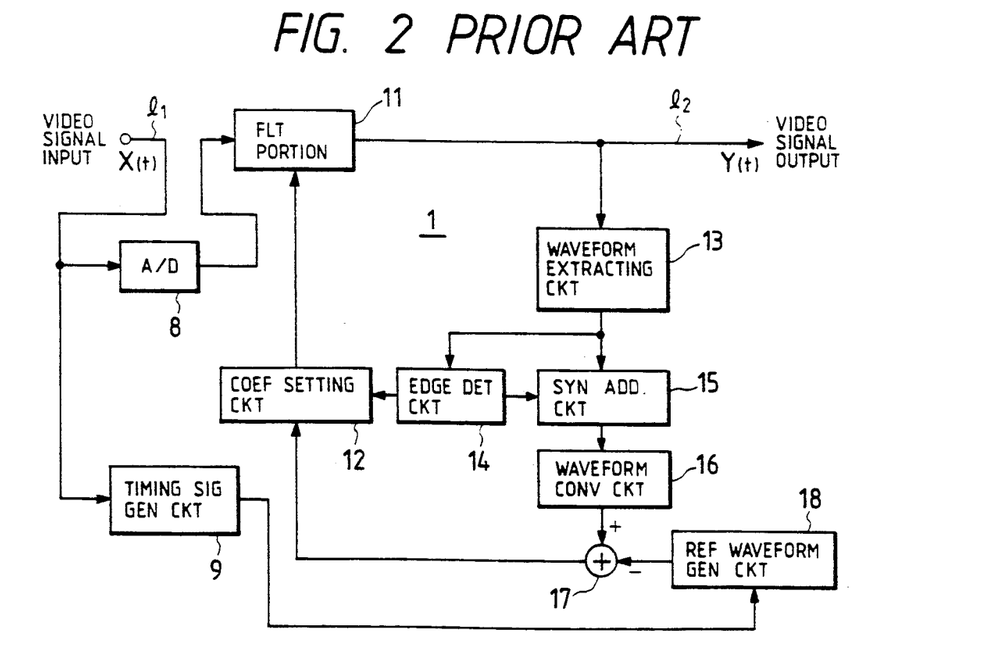
FIG. 2 is a schematic block diagram for showing the construction of a typical example of a conventional ghost cancelling device.

Referring next to FIG. 2, there is shown a typical example of a conventional ghost cancelling device according to the above described operating principle. In FIG. 2, reference numeral 8 denotes an analog-to-digital (A/D) conversion circuit; 9 a timing signal generating circuit; 11 a filtering portion which is a transversal filter composed of an FIR (Finite Impulse-Response) filter, an IIR (Infinite Impulse-Response) filter and so on; 12 a coefficient setting circuit; 13 a waveform extracting circuit; 14 an edge detecting circuit; 15 a synchronizing addition circuit; 16 a waveform converting circuit; 17 a subtracter; and 18 a reference waveform generating circuit. The timing signal generating circuit 9 generates a timing signal from horizontal synchronization and vertical synchronization signals and burst signal included in input video signal and further supplies the generated timing signal to the reference waveform generating circuit 18 to thereby synchronize the waveform extracting circuit 13 with the reference waveform generating circuit 18. Incidentally, although analog expressions are used in the following explanations for simplicity of description, devices and circuits operate with signals sampled by using a sampling frequency of which the value is equal to, for instance, $4f_{sc}$ in practice.

Here, $f_{sc}$ designates a chrominance subcarrier frequency and is nearly equal to 3.58 MHz.

In the conventional ghost cancelling device 1 of FIG. 2 first, an input video signal X(t) supplied through an input line $l_1$ is converted by the A/D converting circuit 8. Then, the converted signal is fed to the filtering portion 11 made up of a recursive or nonrecursive transversal filter. Further, values of conversion coefficients used in the filter are controlled by the coefficient setting circuit 12. Thereafter, an output of the filtering portion 11 is supplied through a line $l_2$ to the waveform extracting circuit 13 as an output video signal Y(t). By the waveform extracting circuit 13, a part of the output video signal including the reference signal and corresponding to a predetermined period of time (e.g., a period of time corresponding to one horizontal scanning line) is extracted. In passing, the waveform extracting circuit 13 may be constructed by using a delay circuit (not shown) for delaying the converted input video signal by a period of time corresponding to four fields and a subtracter (not shown) for effecting a subtraction between the converted input signal and the delayed signal. Thereby, the waveforms of the bar-like GCR signal as shown in FIGS. 3(I) and (J) are obtained from the reference signal as shown in FIGS. 3(A)-(H). Then, the waveform extracting circuit 13 outputs the obtained bar-like GCR signal to the edge detecting circuit 14 and the synchronizing addition circuit 15 of the next stage. The edge detecting circuit 14 detects a middle point of the leading edge portion of the bar-like GCR signal from a position at which the GCR signal has a maximum amplitude determined by effecting difference processing. Further, by utilizing the detected middle points, the edges of the bar-like GCR signals supplied to the edge detecting circuit 14 every fields are adjusted to a corresponding position in each of the fields. Incidentally, in case of the waveform as shown in FIG. 3(J), the polarity is inverted. Subsequently, the GCR signals are added up in a synchronized manner by the synchronizing addition circuit 15.

Next, the waveform converting circuit 16 generates a pulse-like waveform as shown in FIG. 3(K) by performing waveform conversion processing such as a difference and differentiation on the waveform of the bar-like GCR signal as shown in FIG. 3(I) of which the signal-to-noise ratio (S/N) has been improved by the addition effected by the synchronizing addition circuit 15 and further supplies the generated pulse to a positive input terminal of the subtracter 17. That is, the leading edge portion of the waveform of the bar-like GCR signal is used for generating a reference pulse of which the waveform reflects. transmission characteristics of the device.

On the other hand, the reference waveform generating circuit 18 generates an intrinsic reference signal (hereinafter sometimes referred to as an internal reference signal) as shown in FIG. 3(M) and supplies the generated internal reference signal to a negative input terminal of the subtracter 17. Thus, in the subtracter 17, a comparison (i.e., a subtraction) between the waveform of the pulse-like signal inputted to the positive input terminal thereof and that of the internal reference signal inputted to the negative input terminal thereof. As a result of this subtraction, the waveform including only a ghost as shown in FIG. 3(N) is obtained. The subtracter 17 outputs the result of this subtraction to the coefficient setting circuit 12 of the next stage as a sequence of error signals ($\epsilon_n$). The coefficient setting circuit 12 has a function of determining tap-coefficients $W_n$ of the transversal filter of the filtering portion 11. For example, the coefficient setting circuit 12 determines the tap-coefficient $W_n$ by successively and repeatedly calculating the following recurrent formula by using the error signals $\epsilon_n$:

$$W_n^{(v+1)} = W_n^{(v)} - a^{(v)} \epsilon_n^{(v)} \qquad (1)$$

where $v$ denotes the number of the calculation already performed and $\alpha$ ordinarily designates a constant less than 1. Incidentally, $\alpha$ may be changed depending on $v$. Thus, a ghost component as illustrated in FIG. 3(N) becomes smaller than a limit of visual perception. That is, the filtering portion 11 outputs video signals from which a ghost is cancelled (or reduced). In passing, the coefficient setting circuit 12 should have a function of performing an operation (i.e., a calculation) as described above and is accordingly constructed by a microcomputer, a microprocessor or the like.

In addition, the circuit of FIG. 2 is an example of a ghost concelling device of a feedback control type in which an extraction of a reference signal is performed by a part thereof at the side of an output of the filtering portion 11, and tap-coefficients $W_n$ are successively updated. However, there is another ghost cancelling device of a feedforward control type in which a extraction of a reference signal is performed by a part thereof at the side of an input of the filtering portion 11, and outputs of the filter obtained from tap-coefficients $W_n$ already calculated are not used to determine gains of taps. In each of the feedback control type and the feedforward control type of the ghost cancelling devices, a random noise component included in a part of video signals corresponding to a reference signal is reduced by the synchronizing addition circuit 15.

As above described, in the conventional ghost cancelling device 1, the waveform extracting circuit 13 performs a waveform extracting function by extracting a bar-like GCR signal as a detection reference signal from the difference between an input signal at a given moment and another signal (i.e., a four-field delay signal) preceding the input signal by a period of time corresponding to four fields (i.e., from the result of a subtraction between the input signal at a given moment and the delay signal). However, there may be a case where the period of time by which the input signal and the delay signal are separated from each other is not accurately equal to a period of time corresponding to four fields due to a fluctuation in clock pulses which is caused by jitter noises included in video signals, a fluctuation in a video signal due to a change of a scene for another effected in a TV station, an impulse-like disturbance pulse noise and so on. In such a case, an unnecessary signal, which ought not to exist, may be generated under the influence of a cancelling error, which may occur due to the fact that the difference between the input video signal and the delay signal is not accurately equal to a period of time corresponding to four fields, and of a ghost if exists. This results in an erroneous detection of an unnecessary signal and in a malfunction of the device. Moreover, the conventional ghost cancelling device has a drawback that it has no countermeasures for preventing such a malfunction thereof.

The present invention is created to eliminate the above described drawback of the conventional ghost cancelling device.

It is accordingly an object of the present invention to provide a ghost cancelling device which can prevent a malfunction even when a disturbance in an input video signal is caused by jitter noises and so forth.

SUMMARY OF THE INVENTION

To achieve the foregoing object and in accordance with of the present invention, there is provided a ghost cancelling device using a reference signal for cancelling a ghost, in which a GCR signal and an auxiliary signal pairing with the GCR signal are arranged at a predetermined period in such a manner to have predetermined phases, as a signal for detecting a ghost, and comprises various composing elements as follows. That is, the ghost cancelling device according to the present invention first has a filtering portion made up of a transversal filter for cancelling a ghost component included in input video signals, a waveform extracting circuit for extracting a part, which corresponds to a predetermined period of time and includes the reference signal, of a signal included in the input video signal, a waveform converting circuit for performing the waveform conversion of the signal corresponding to the predetermined period of time and extracted from the input video signal, a subtracter for comparing an output of the waveform converting circuit with a preset reference waveform and outputting a signal in accordance with the result of the comparison and a coefficient setting circuit for setting coefficients having values in accordance with the output signal of the subtracter. The ghost cancelling device according to the present invention further includes a waveform checking circuit interposed between the waveform extracting circuit and the waveform converting circuit. This waveform checking circuit includes a first decision operation means operable in a period of time, in which a burst signal is originally present but the burst signal should be currently absent by being cancelled, for receiving the detection reference signal separated from the output of the waveform exctracting circuit by a predetermined period of time, detecting characteristics of the waveform of the GCR signal and deciding from the detected characteristics of the GCR signal whether or not a GCR signal obtained by cancelling a horizontal synchronization signal and a burst signal by subtracting the reference signal from the output of the waveform extracting circuit is present and a second decision operation means operable in a predetermined period of time, in which a GCR signal is originally present, for detecting characteristics of the waveform of the GCR signal and deciding from characteristics of the waveform of the GCR signal whether or not the GCR signal is present. Thus, the waveform checking circuit decides from the contents of the decisions made by the first and second decision operation means whether or not the output of the waveform extracting circuit should be sent to the waveform converting circuit.

Further, as will be described later, by the checking a level of a part, in which a burst signal is cancelled, of a waveform of a signal obtained by a subtraction between the detection reference signals separated by a predetermined period of time (e.g., corresponding to four files) and also checking a level of a part, which corresponds to a predetermined period of time, of waveform of a bar-like GCR signal, the ghost cancelling device embodying the present invention detects a fluctuation in a video signal, which is usually stable, caused by a disturbance which sometimes happens or by jitter noises frequently mixed thereinto at a system for generating the video signal (e.g., a transmitting system of a broadcasting station). Thus, the ghost cancelling device according to the present invention interrupts an operation of cancelling a ghost when a signal which is not regular and not normal comes thereinto. Thereby, the ghost cancelling device according to the present invention can prevent occurrence of a malfunction and a runaway. This realizes a highly stable and reliable operation of the device. Additionally, the ghost cancelling device of the present invention can be easily and economically implemented by adding a relatively low number of composing elements to the conventional device.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIGS. 3(A)~(N) are waveform charts for illustrating operations of the ghost cancelling devices of FIGS. 1 and 2;

FIGS. 5(A)~(M) are waveform charts for illustrating operations of the waveform checking circuit of FIG. 4;

FIGS. 7(A)~(N) are waveform charts for illustrating operations of the waveform checking circuit of FIG. 6; and FIGS. 8(A) and (B) are graphs for showing filtering characteristics of a filtering circuit of the waveform checking circuit of FIG. 6.

DETAILED DESCRIPTION OF THE PREFERRED EMBODIMENTS

Hereinafter, preferred embodiments of the present invention will be described in detail by referring to the accompanying drawings.

Figure 1:
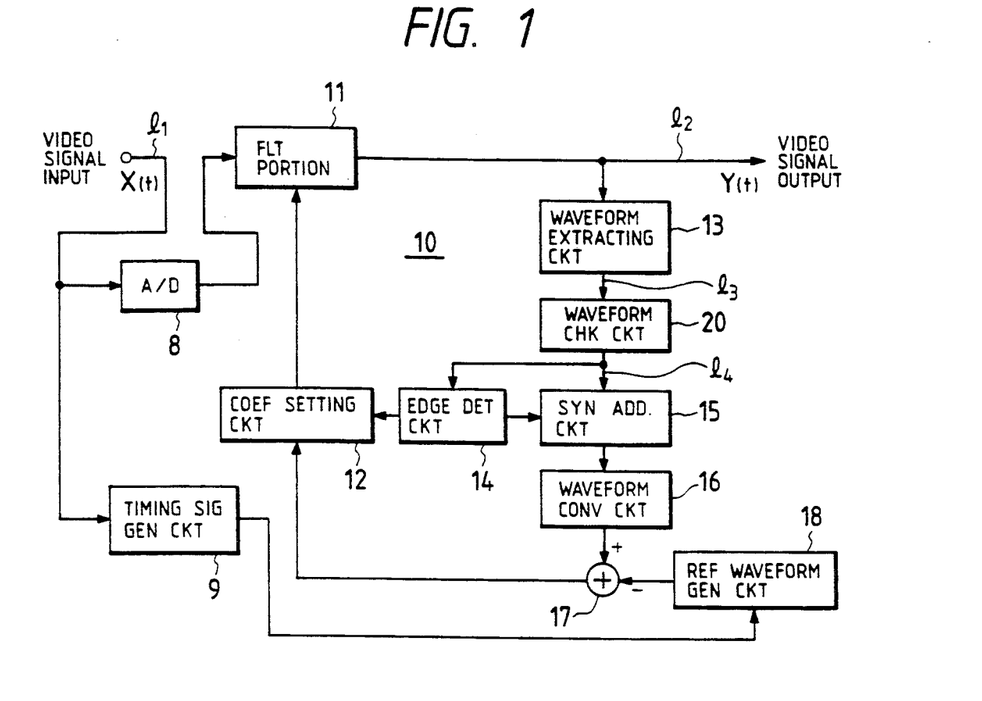
FIG. 1 is a schematic block diagram for showing the construction of a ghost cancelling device according to the present invention.

Referring first to FIG. 1, there is shown a ghost cancelling device 10 embodying the present invention. In this figure, like reference characters designate like composing elements of the conventional ghost cancelling device 1 of FIG. 2. Thus, descriptions of such composing elements are omitted herein for brevity of description. That is, as can be understood by comparing FIG. 1 with FIG. 2, the ghost cancelling device 10 of the present invention is constructed by interposing a waveform checking circuit 20 between the edge detecting circuit 14 and the synchronizing addition circuit 15. Other composing elements and operations thereof are the same as of the conventional ghost cancelling device 1. Thus, descriptions of such composing elements and operations thereof are omitted herein. Hereunder, a waveform checking circuit 20, which is a new composing element, will be described in detail with reference to FIGS. 4 and 6 and waveform charts of FIGS. 5(A)~(M) and 7(A)~(N).

Figure 4:
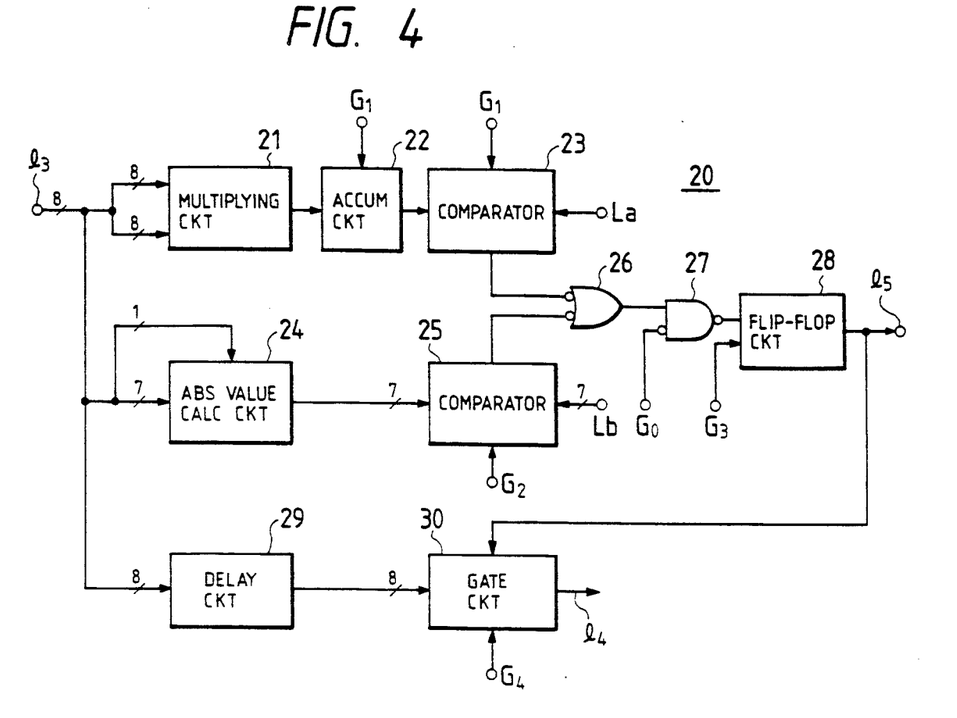
FIG. 4 is a schematic block diagram for showing the construction of a first embodiment of a waveform checking circuit of the ghost cancelling device of FIG. 1.

Referring to FIG. 4, there is shown a first embodiment of the waveform checking circuit 20 of the ghost cancelling device of FIG. 1. In FIG. 4, reference numeral 21 designates a multiplying circuit; 22 an accumulating circuit; 23 and 25 comparators; 24 an absolute-value calculating circuit; 26 and 27 NAND gate circuits (hereunder referred to simply as NAND circuits); 28 a flip-flop circuit; 29 a delay circuit; and 30 a gate circuit. Incidentally, in this embodiment; each video signal represents 8-bit data.

A reference signal, which is supplied from the waveform extracting circuit 13 to the waveform checking circuit 20, for cancelling a ghost is a bar-like GCR signal as shown in FIGS. 5(A) or (B) (corresponding to FIGS. 3(I) and (J), respectively). As stated above, a subtraction between two detection reference signals separated from each other by a period of time corresponding to four fields is effected to cancel a horizontal synchronization signal and a burst signal. In case where a sampling frequency is equal to $4f_{sc}$, a period of time corresponding to four fields is equivalent to a period of time corresponding to 9,555,000 ($=4 \times 262.5 \times 910$) samples. Thus, stabilization of the device is effected by usually forming a voltage-controlled oscillator (VC0) using crystal. However, there may be a case that the period of time by which the two detection reference signals are separated from each other is not precisely equal to a period of time corresponding to four fields due to a fluctuation in clock pulses or in synchronizing reproduction signals which is caused by jitter noises included in video signals, a fluctuation in a video signal due to a change of a scene for another effected in a TV station, an impluse-like disturbance pulse noise or a ghost. In such a case, owing to the fact that the period of time by which the two detection reference signals are separated from each other is not precisely equal to a period of time corresponding to four fields, the cancelling of the horizontal synchronization signal and the burst signal is not effectively effected. Thus, as illustrated in FIG. 5(C), the remnants (or residues) Ba of the burst signal, which are not cancelled and remains after the cancellation of the burst signal, and "whiskers" Ha of the horizontal synchronization signal are present. Especially, the remnants Ba of the burst signal are liable to appear because the frequency of the burst signal is 3.58 MHz. That is, even if the time difference between the two reference signals is varied from a period of time corresponding to four fields by a period of time corresponding to only one sample, a fraction of the original burst signal is not cancelled. Thus, in the device 10 into which the first embodiment of the waveform checking circuit 20 is inserted, the remnants Ba of the burst signal are detected and are used as a standard (or criterion) for deciding whether an input signal (i.e., a GCR signal) is normal or abnormal.

Figure 5:
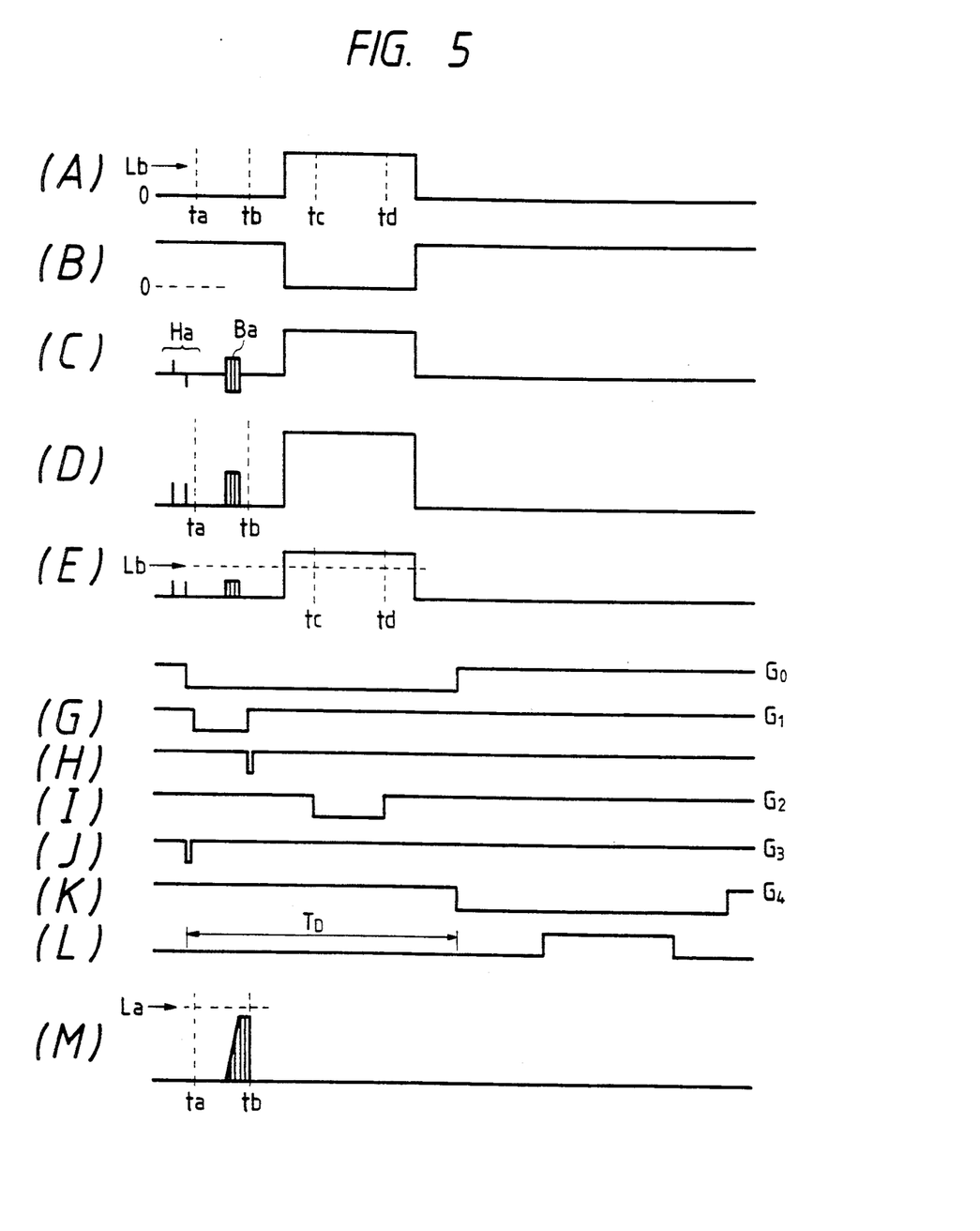

Next, a practical operation of primary parts of the ghost cancelling device 10 of the present invention having the arrangement of FIG. 4 will be described in detail by referring to the waveform chart of FIG. 5.

First, when the signal (i.e., the bar-like GCR signal) of FIG. 5(A) or (B) is supplied through an input line l₃ to both of input terminals of the multiplying circuit 21, the square value of data represented by the inputted signal is outputted from the multiplying circuit 21. That is, the square value of data, which is for example a two's complement represented by using eight bits, can be obtained by inputting the same data into the multiplying circuit 21 as a multiplier and a multiplicand. If the signal of FIG. 5(C) including the remnants Ba of the burst signal is supplied to the multiplying circuit 21, an output of the multiplying circuit 21 having a waveform of FIG. 5(D) is fed to the accumulating circuit 22 to which a control signal $G_1$ having a waveform illustrated in FIG. 5(G) is also supplied. In the accumulating circuit 22, when this control signal $G_1$ has a low level (corresponding to a period $t_a \sim t_b$ of FIG. 5(D)), an accumulation of the square value represented by the data fed thereto is performed. The accumulating circuit 22 rounds the result of the accumulation such that the result of the accumulation can be indicated by data, which is represented by using an appropriate number of bits (e.g., eight bits). Further, the data representing the rounded result of the accumulation is outputted from the accumulating circuit 22. Thus, if the signal having the waveform illustrated in FIG. 5(D) is inputted to the accumulating circuit 22, a signal having a waveform of FIG. 5(M) is outputted from the accumulating circuit 22. Incidentally, the accumulating circuit 22 is cleared at the time of commencing the accumulation of the square value and after the accumulation is completed and data indicating the result of the accumulation is transferred to the comparator 23. When a negative pulse as illustrated in FIG. 5(H) is detected, the comparator 23 compares the accumulated square value of a cancelling error of the burst signal with a preset value $L_a$ (see FIG. 5(M)) which is determined from an actually measured value by taking an S/N condition into consideration. If the accumulated square value is larger than the preset value $L_a$, a signal having a low level (hereunder sometimes referred to as a LOW signal) is sent therefrom to the NAND circuit 26. Otherwise, another signal having a high level (hereunder sometimes referred to as a HIGH signal) is outputted therefrom.

On the other hand, the signal (i.e., the bar-like GCR signal) from the input line l₃ is also fed to the absolute-value calculating circuit 24 as 8 bit-data. Practically, the absolute-value calculating circuit 24 comprises seven 2-input EXCLUSIVE-OR (EXOR) circuits. Each of lines transmitting data which represents each of seven bits of the 8-bit data other than the most significant bit (MSB) thereof is connected to a corresponding input terminal of each of the EXOR circuits. Further, a line transmitting data representing the MSB of the 8-bit data is connected to another input terminal of each of the EXOR circuits. When the data representing the MSB is equal to 1 (i.e., the 8-bit data represents a negative value), the inputted signal is inverted and is subsequently outputted to the comparator 25 of the next stage. Moreover, when the data representing the MSB is equal to 0 (i.e., the 8-bit data represents a positive value), the inputted signal is outputted to the comparator 25 without being inverted. As illustrated in FIG. 4, an output of the absolute-value calculating circuit 24 is 7-bit data.

Furthermore, a control signal $G_2$ as shown in FIG. 5(I) is supplied to the comparator 25. When this control signal has a low level (i.e., in a period $t_o \sim t_d$ of time as illustrated in FIG. 5(E)), it is determined by a comparison of levels of the bar-like GCR signal with a preset value $L_b$ (see FIG. 5(E)) whether or not the bar-like GCR signal has an original waveform. If at least one of the levels is smaller than the preset value $L_b$, the comparator 25 sends a LOW signal to the NAND circuit 26. Otherwise, the comparator 25 sends a HIGH signal thereto. By effecting such an operation, characteristics of the waveform of the bar-like GCR signal are sensed. Namely, the NAND circuit 26 outputs a HIGH signal only if at least one of the output of the comparator 23 and that of the comparator 25 comes to have a low level.

Further, the NAND circuit 27 outputs a LOW signal to the flip-flop circuit 28 only when a HIGH signal comes from the NAND circuit 26 during a control signal (hereunder sometimes referred to as a reference-signal indicating pulse) $G_0$ of FIG. 5(F) has a low level. The flip-flop circuit 28 sets an output thereof to be at a low level in response to a clearing pulse $G_3$ (see FIG. 5(J)) generated from a leading edge portion of the reference signal indicating pulse $G_0$. In contrast, the flip-flop circuit 28 presets a signal transmitted on an output line $l_5$ to be at a high level only when the LOW signal comes from the NAND circuit 27 thereto. If the signal transmitted on the output line $l_5$ comes to have a high level, it is indicated that an abnormal reference signal comes into the device. Thus, an operation of cancelling a ghost is interrupted in order to prevent occurrence of a malfunction. Further, the signal outputted to the output line $l_5$ is supplied to the synchronizing addition circuit 15 of the next stage to control the circuit 15 in such a manner not to effect a synchronizing addition.

Moreover, the delay circuit 29 is used to compensate a time lag or delay generated in a signal processing system comprised of the elements from the multiplying circuit 21 to the flip-flop circuit 28. The time lag compensated by the circuit 29 is preset to be a period $T_D$ (see FIG. 5(L)) of time in which the reference signal indicating pulse $G_0$ has a low level. This period $T_D$ is equivalent to a period of time corresponding to about one line (i.e., a horizontal scanning line). Furthermore, the gate circuit 30 is adapted to output a signal sent from the delay circuit 29 to a line $l_4$ only when the output of the flip-flop circuit 28 has a low level and a control signal $G_4$ (see FIG. 5(K)) has a low level. That is, if an output of the flip-flop 28 comes to have a high level and thus the device is put into an abnormal receiving condition, a signal transmitted on the output line $l_4$ is made to be 0. Thus, in a normal receiving condition, a signal of FIG. 5(L) is outputted to the line $l_4$. In this case, an input signal from the line $l_3$ has the waveform of FIG. 5(A).

Furthermore, an output of the waveform checking circuit 20 having the above described arrangement and functions is supplied through the line $l_4$ to the edge detecting circuit 14 and the synchronizing addition circuit 15. Thereafter, the ghost cancelling device of FIG. 1 performs similar signal processing as in case of the conventional ghost cancelling device of FIG. 2. Especially, a coefficient setting operation effected in the coefficient setting circuit 12 can be interrupted by using the output of the flip-flop circuit 28. That is, during an operation expressed by the equation (1) is performed, the performing of the operation can be substantially interrupted by setting the coefficient $\alpha^{(v)}$ to be 0 if the output of the flip-flop circuit 28 has a high level.

Thus, even when a TV signal is momentarily disturbed, occurrence of a malfunction can be prevented. Especially, even when a disturbance in a TV signal, which is liable to happen in case where the filtering portion 11 is made up of a recursive transversal filter and is also liable to trigger a divergence and an oscillation, occurs, occurrence of a malfunction can be fully prevented.

Incidentally, the ghost-cancelling-operation interrupting function effected by using an output signal outputted through the line $l_5$ of FIG. 4 overlaps with that of the gate circuit 30. The ghost cancelling device of the present invention can fully attain the above described object by employing only one of these functions. The device 10 of FIG. 1 makes a good use of both of these functions to increase stability thereof in performing the ghost-cancelling-operation interrupting function. Further, effectiveness of the above described arrangement depends on how an output of the device 10 is utilized by circuits arranged posterior to the device 10 in, e.g., a TV receiver.

Figure 6:
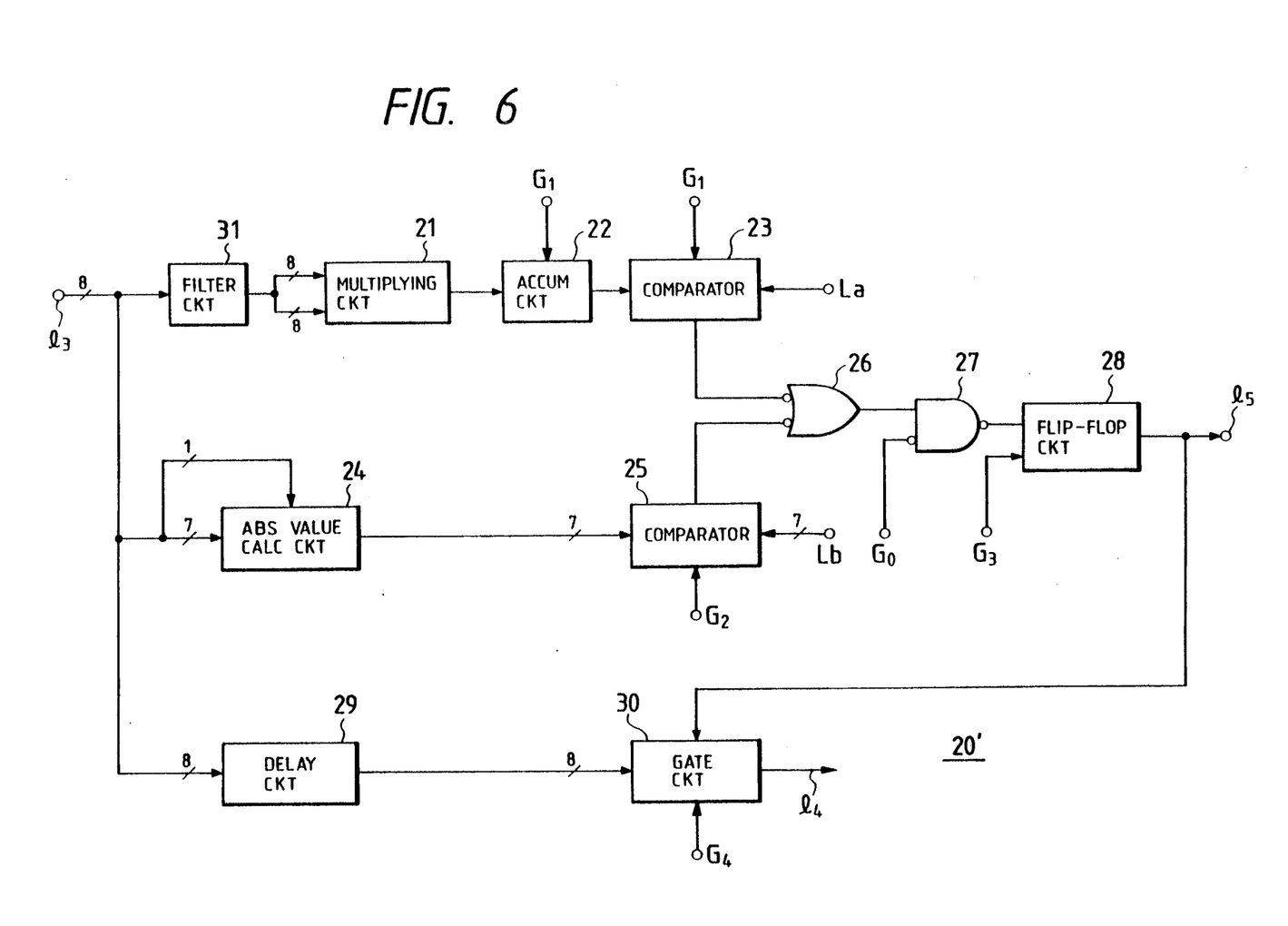
FIG. 6 is a schematic block diagram for showing the construction of a second embodiment of a waveform checking circuit of the ghost cancelling device of FIG. 1.

Next, a second embodiment of the waveform checking circuit 20 will be described in detail with reference to a circuit diagram of FIG. 6 and waveform charts of FIGS. 7(A)~(N). Incidentally, in FIG. 6, like reference characters designate like composing elements of the first embodiment of the waveform checking circuit 20 of FIG. 4. Thus, descriptions of such composing elements are omitted herein for simplicity of description. As described above, the ghost cancelling device provided with the first embodiment of the waveform checking circuit 20 detects the remnants Ba of the burst signal and uses the remnants Ba as a standard for deciding whether the GCR signal is normal or abnormal. It is, however, possible that a pre-ghost component is superposed on the reference signal in a period of time in which the burst signal should be cancelled. Accordingly, the ghost cancelling device provided with the second embodiment of the waveform checking device 20 accurately detects the remnants Ba of the burst signal other than the pre-ghost component and uses the accurately detected remnants Ba as a standard for deciding whether the GCR signal is normal or abnormal.

Figure 8:
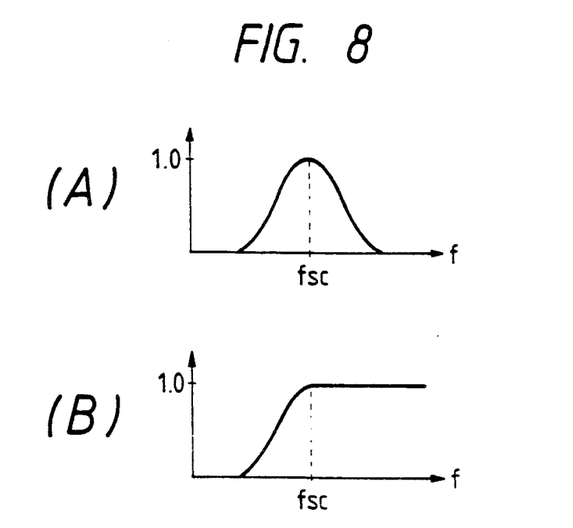

To this end, a filter circuit 31 is provided just prior to the multiplying circuit 21 and outputs only the remnants of the burst signal among signals input through the line $l_3$ thereto to the multiplying circuit 21 of the next stage. Therefore, a band-pass filter (BPF), of which the center frequency is equal to the chrominance subcarrier frequency $f_{sc}$ as illustrated in FIG. 8(A), may be employed as the filter circuit 31. Alternatively, a high-pass filter (HPF) which has frequency response characteristics as illustrated in FIG. 8(B) and thus does not pass a signal having a frequency equal to or less than $F_{sc}$ therethrough may be also employed as the filter circuit 31. Incidentally, in the following description, it is assumed that the filter circuit 31 is a BPF having frequency response characteristics as illustrated in FIG. 8(A). Additionally, in the second embodiment of the waveform checking circuit 20, each data is for example a two's complement represented by using eight bits.

Figure 7:
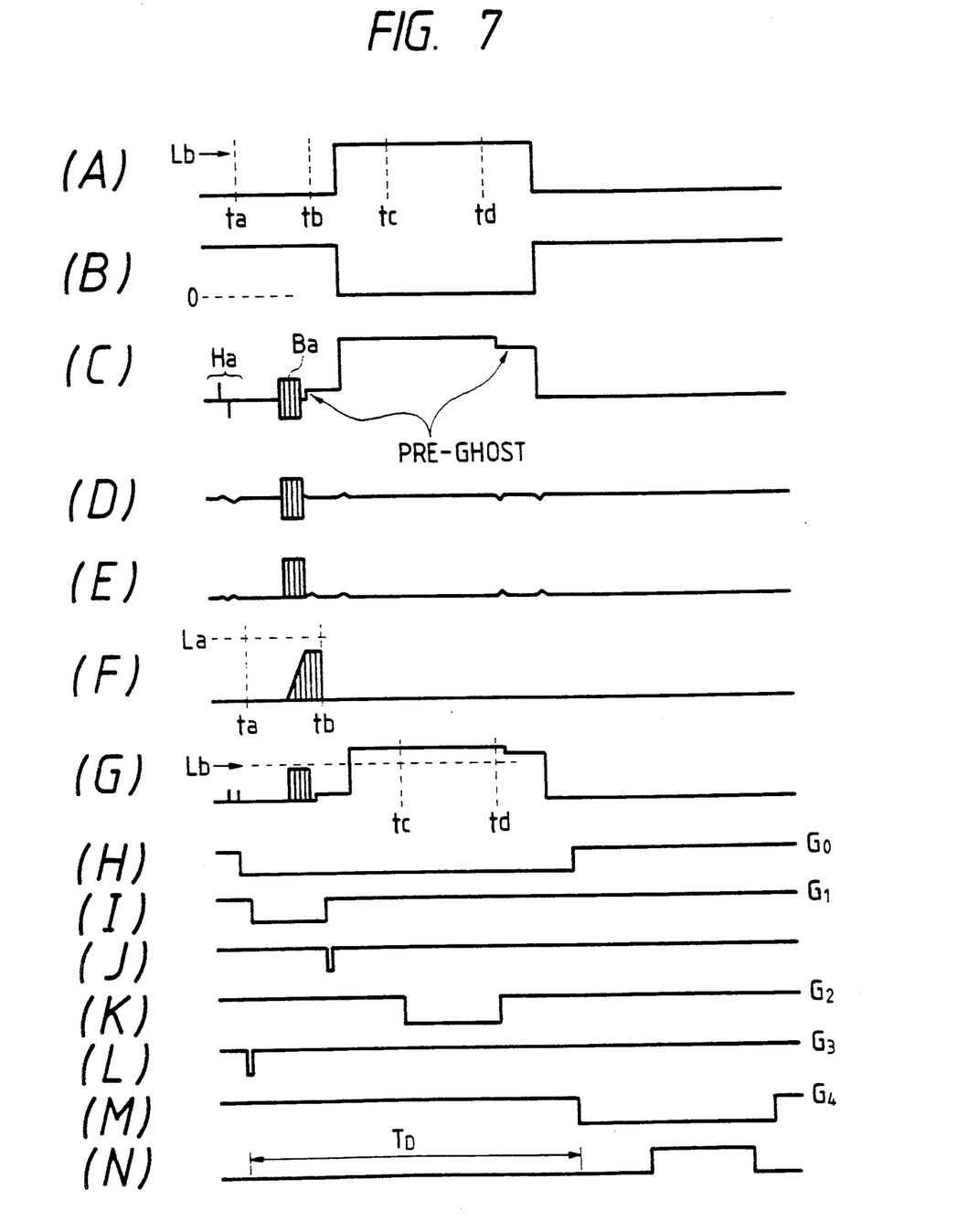

When a signal having a waveform as shown in FIG. 7(C) which is substantially the same as a waveform of FIG. 5(C) comes into the filtering signal 31, an output of the filter circuit 31 has a waveform as illustrated in FIG. 7(D), which is obtained by eliminating low-frequency components. Subsequently, the output of the filter circuit 31 is supplied to both of the input terminals of the multiplying circuit 21 and further is squared. Thus, an output of the multiplying circuit 22 has a waveform as illustrated in FIG. 7(E) and is fed to the accumulating circuit 22 to which a control signal $G_1$ having a waveform illustrated in FIG. 7(I) is also supplied. In the accumulating circuit 22, when this control signal $G_1$ has a low level (corresponding to a period $t_a \sim t_b$ of FIG. 7(F)), an accumulation of the square value represented by the data fed thereto is performed. The accumulating circuit 22 rounds the result of the accumulation such that the result of the accumulation can be indicated by data, which is represented by using an appropriate number of bits (e.g., eight bits). Further, the data representing the rounded result of the accumulation is outputted from the accumulating circuit 22. Thus, if the signal having the waveform illustrated in FIG. 7(E) is inputted to the accumulating circuit 22, a signal having a waveform of FIG. 7(F) is outputted from the accumulating circuit 22. Incidentally, the accumulating circuit 22 is cleared at the time of commencing the accumulation of the square value and after the accumulation is completed and data indicating the result of the accumulation is transferred to the comparator 23. When a negative pulse as illustrated in FIG. 7(J) is detected, the comparator 23 compares the accumulated square value of a cancelling error of the burst signal with a preset value $L_a$ (see FIG. 7(F)) which is determined from an actually measured value by taking an S/N condition into consideration. If the accumulated square value is larger than the present value $L_a$, a signal having a low level is sent therefrom to the NAND circuit 26. Otherwise, another signal having a high level is outputted therefrom.

Thereafter, signal processing is performed in the second embodiment of the waveform checking circuit in accordance with an operating principle similar to the operating principle of the first embodiment of the waveform checking circuit. Thereby, can be obtained a video signal from which a pre-ghost component is favorably removed.

In passing, in the foregoing description, an extraction of a reference signal is performed by a part thereof at the side of an output of the filtering portion 11, and tap-coefficients $W_n$ are successively updated (i.e., a feedback type control). However, another type control (i.e., a feedforward type control) may be employed in which a extraction of a reference signal is performed by a part thereof at the side of an input of the filtering portion 11, and outputs of the filter obtained from tap-coefficients $W_n$ already calculated are not used to determine gains of taps. Namely, the present invention can be applied to each of the feedback control and the feedforward control type of the ghost cancelling devices.

Incidentally, in the foregoing description of the operations of the ghost cancelling device of the present invention, it is assumed that an NTSC video signal for use in broadcasting, which is put to practical use in Japan and in which a reference signal for cancelling a ghost is inserted into a period of time corresponding to a vertical interval test signal (VITS) is employed as a video signal applied to the device of the present invention. As above described, in the reference signal for cancelling a ghost, four pairs of a GCR signal for detecting a ghost and a pedestal signal (hereunder sometimes referred to as a zero pedestal signal), which is an auxiliary signal and pairs the GCR signal, are arranged as four phases such that a GCR signal and a zero pedestal signal of each pair are separated from each other by four fields. However, note that the present invention can be effectively applied to a ghost cancelling device in case where a GCR signal and a zero podestal signal in a reference signal for cancelling a ghost are separated from each other by even lines. In such a case, a horizontal synchronization signal, a burst signal and their ghosts are cancelled by effecting a subtraction between two lines respectively corresponding to a GCR signal and a zero pedestal signal of each pair, so that only a GCR signal is obtained and thus another ghost can be detected in a wide range.

Further, in the above described embodiments of the present invention, the GCR signal has a bar-like signal and the auxiliary signal is a zero pedestal signal. However, any other signals can be employed as a GCR and auxiliary signals in the ghost cancelling device of the present invention if a waveform for detecting ghosts can be obtained by performing a subtraction between such a GCR and auxiliary signals as a basic operation. For instance, a GCR signal may be a pulse-like signal. In such a case, the waveform converting circuit for performing the difference or differential operation on the waveform of the signal extracted by the waveform extracting circuit is unneccessary. Alternatively, a GCR signal may be a sequence of pseudo-random pulses. In this case, the waveform converting circuit need to perform a cross-correlation operation between the sequence of the pseudo-random pulses and an ideal form thereof instead of performing the difference or differential operation. Further, the synchronizing addition circuit becomes unnecessary. In addition, the present invention can be effectively applied to a ghost cancelling device even in case that two pseudo-random signals, of which the polarities are opposite to each other, are respectively employed as a GCR and auxiliary signals.

As stated above, the present invention can be effectively applied to a ghost cancelling device by first cancelling a horizontal synchronization and burst signals by performing a subtraction between a GCR signal and an auxiliary signal paring the GCR signal and separated from the GCR signal by a predetermined period of time and further extracting a reference signal for cancelling a ghost.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A ghost cancelling device using a ghost-cancelling reference signal to detect a ghost, the ghost-cancelling reference signal including a ghost canceller reference signal and an auxiliary signal pairing with the ghost canceller reference signal, the ghost canceller reference signal and the auxiliary signal being arranged at a predetermined period in such a manner to have predetermined phases, said ghost-cancelling device comprising a filtering portion made up of a transversal filter for cancelling a ghost component included in input video signals, a waveform extracting circuit for extracting a part of the input video signal which corresponds to a predetermined period of time and includes the ghost-cancelling reference signal, a waveform converting circuit for performing the waveform conversion of the signal corresponding to the predetermined period of time extracted from the input video signal, a subtracter for comparing an output of the waveform converting circuit with a preset reference waveform and outputting a signal in accordance with the result of the comparison, a coefficient setting circuit for setting coefficients having values in accordance with the output signal of said subtracter, and a waveform checking circuit interposed between said waveform extracting circuit and said waveform converting circuit for deciding whether or not the output of the waveform extracting circuit should be sent to the waveform converting circuit, wherein said waveform checking circuit includes:

a first decision operating means, operable in a period of time in which a burst signal is originally present but currently absent by being cancelled by said subtracter, for receiving the ghost canceller reference signals separated from each other by a predetermined period of time and obtained by cancelling a horizontal synchronization signal and a burst signal by subtracting the ghost-cancelling reference signal from the output of said waveform extracting circuit, for calculating and accumulating square values of data indicated by the ghost canceller reference signals, and for deciding from the accumulated square value whether or not remnants of the horizontal synchronization signal and the burst signal are present in the ghost canceller reference signal;

a second decision operation means, operable in a predetermined period of time in which a ghost canceller reference signal is originally present, for receiving the ghost-cancelling reference signals that are included in the output of said waveform extracting circuit and separated from each other by a predetermined period of time, for detecting characteristics of the waveform of the ghost canceller reference signal from the received ghost-cancelling reference signals, and for deciding from characteristics of the waveform of the ghost canceller reference signal whether or not the ghost canceller reference signal is present; and a third decision operation means for receiving the results of the decisions made by said first and second decision operation means and for deciding, from the received results of the decisions made by said first and second decision opeation means, whether or not the output of the waveform extracting circuit should be sent to the waveform converting circuit.

2. A ghost cancelling device as set forth in claim 1, wherein said first decision operation means comprises:

a multiplying circuit means for receiving the ghost canceller reference signal and for outputting a first signal representing a square value of data indicated by the ghost canceller reference signal;

an accumulating means for receiving the first signal outputted from said multiplying circuit, for accumulating the square value indicated by the received signal and for outputting a second signal representing the accumulated square value; and a first comparing means for receiving the second signal outputted from said accumulating means, for comparing the accumulated square value with a first predetermined value, and for outputting a third signal which indicates that the ghost canceller reference signal, included in the output of said waveform extracting means, is abnormal when the accumulated square value is greater than the first predetermined value.

3. A ghost cancelling device as set forth in claim 1, wherein said second decision operation means comprises:

an absolute value calculating means for receiving the ghost canceller reference signal, for calculating the absolute value of data indicated by the received ghost canceller reference signal, and for outputting a first signal representing the calculated absolute value; and a first comparing means for receiving the first signal outputted from said absolute value calculating means, for comparing the absolute value represented by the first signal with a first predetermined value, and for outputting a second signal which indicates that the ghost canceller reference signal, included in the output of said waveform extracting means, is abnormal with the absolute value is less than the second predetermined value.

4. A ghost cancelling device as set forth in claim 1, wherein said first decision operation means comprises:

a filtering means for receiving the ghost canceller reference signal and for outputting a first signal representing only a residue of a burst signal;

a multiplying circuit means for receiving the first signal and for outputting a second signal representing a square value of data indicated by the first signal;

an accumulating means for receiving the second signal outputted from said multiplying circuit, for accumulating the square value indicated by the received second signal, and for outputting a third signal representing the accumulated square value; and a first comparing means for receiving the third signal outputted from said accumulating means, for comparing the accumulated square value with a first predetermined value, and for outputting a fourth signal which indicates that the ghost canceller reference signal, inluded in the output of said waveform extracting means, is abnormal when the accumulated square value is greater than the first predetermined value.

5. A ghost cancelling device as set forth in claim 1, wherein said third decision operation means includes a NAND gate means for receiving, from the first and second decision operation means, the result of the decisions respectively made by said first and second decision operation means and for outputting a signal, indicating that the output of the waveform extracting circuit should not be sent to the waveform converting circuit, when at least one of the results of the decisions respectively made by said first and second decision operation means indicates that the output of said waveform extracting means is abnormal.

* * * * *